(12) United States Patent
Wierich (10) Patent No.: US 9,743,002 B2
(45) Date of Patent: Aug. 22, 2017

(54) VEHICLE VISION SYSTEM WITH ENHANCED DISPLAY FUNCTIONS

(71) Applicant: MAGNA ELECTRONICS INC., Auburn Hills, MI (US)

(72) Inventor: Thomas Wierich, Butzbach (DE)

(73) Assignee: MAGNA ELECTRONICS INC., Auburn hills, MI (US)

( * ) Notice: Subject to any disclaimer, the term of this patent is extended or adjusted under 35 U.S.C. 154(b) by 845 days.

(21) Appl. No.: 14/082,573

(22) Filed: Nov. 18, 2013

(65) Prior Publication Data

US 2014/0139676 A1 May 22, 2014

Related U.S. Application Data

(60) Provisional application No. 61/727,912, filed on Nov. 19, 2012.

(51) Int. Cl.
*H04N 7/18* (2006.01)
*H04N 5/232* (2006.01)
(Continued)

(52) U.S. Cl.
CPC ........... *H04N 5/23293* (2013.01); *B60R 1/00* (2013.01); *G08G 1/166* (2013.01); *H04N 5/247* (2013.01);
(Continued)

(58) Field of Classification Search
CPC .... H04N 5/23293; H04N 7/181; H04N 7/183; H04N 5/23296; B60R 1/00
See application file for complete search history.

(56) References Cited

U.S. PATENT DOCUMENTS 4,987,357 A 1/1991 Masaki
5,001,558 A 3/1991 Burley et al.
(Continued)

FOREIGN PATENT DOCUMENTS

DE 102010010912 12/2010
DE 102009027755 1/2011
(Continued)

OTHER PUBLICATIONS

Burt et al., A Multiresolution Spline with Application to Image Mosaics, ACM Transactions on Graphics, vol. 2. No. 4, pp. 217-236, Oct. 1983.
(Continued)

*Primary Examiner* — Shawn An
(74) *Attorney, Agent, or Firm* — Gardner, Linn, Burkhart & Flory, LLP (57) ABSTRACT

A vision system for a vehicle includes at least one image sensor, a control and a display. The image sensor is disposed at a subject vehicle and has a field of view exterior of the vehicle. The control, at least in part responsive to image processing of image data captured by the image sensor, is operable to generate an avatar representative of at least one object or scene segment in the field of view of the image sensor. The display is operable to display the avatar. The vision system may display an avatar that is a substantial representation of an object that is only partially viewed by the image sensor to enhance the display for viewing and understanding by the driver of the subject vehicle, and a portion of the avatar representing the non-viewed portion of the object may be displayed as a phantom image.

14 Claims, 6 Drawing Sheets

(51) Int. Cl.
*H04N 5/247* (2006.01)
*H04N 5/272* (2006.01)
*B60R 1/00* (2006.01)
*G08G 1/16* (2006.01)

(52) U.S. Cl.
CPC .............. *H04N 5/272* (2013.01); *H04N 7/181* (2013.01); *B60R 2300/80* (2013.01)

(56) References Cited

U.S. PATENT DOCUMENTS

| | | |
|---|---|---|
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,059,877 A | 10/1991 | Teder |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,130,709 A | 7/1992 | Toyama et al. |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,307,136 A | 4/1994 | Saneyoshi |
| 5,309,137 A | 5/1994 | Kajiwara |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A * | 5/1995 | Kishi ................. B60R 1/00 345/7 |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,201,642 B1 | 3/2001 | Bos et al. |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |

(56) References Cited

U.S. PATENT DOCUMENTS

| | | |
|---|---|---|
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,553,130 B1 | 4/2003 | Lemelson et al. |
| 6,593,960 B1 | 7/2003 | Sugimoto et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,672,731 B2 | 1/2004 | Schnell et al. |
| 6,690,268 B2 | 2/2004 | Schofield et al. |
| 6,704,621 B1 | 3/2004 | Stein et al. |
| 6,711,474 B1 | 3/2004 | Treyz et al. |
| 6,735,506 B2 | 5/2004 | Breed et al. |
| 6,744,353 B2 | 6/2004 | Sjönell |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 * | 9/2005 | Schofield .............. G01C 21/165 |
| | | 340/988 |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,013,780 B2 | 9/2011 | Lynam et al. |
| 8,027,029 B2 | 9/2011 | Lu et al. |
| 8,849,495 B2 | 9/2014 | Chundrlik, Jr. et al. |
| 9,264,672 B2 | 2/2016 | Lynam |
| 2002/0015153 A1 | 2/2002 | Downs |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0290479 A1 | 12/2006 | Akatsuka et al. |
| 2007/0104476 A1 | 5/2007 | Yasutomi et al. |
| 2008/0231710 A1 | 9/2008 | Asari et al. |
| 2009/0093938 A1 | 4/2009 | Isaji et al. |
| 2009/0113509 A1 | 4/2009 | Tseng et al. |
| 2009/0157481 A1 * | 6/2009 | Jung .................... A61B 5/0476 |
| | | 709/205 |
| 2009/0158206 A1 * | 6/2009 | Myllyla ............... G11B 27/105 |
| | | 715/804 |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0020170 A1 | 1/2010 | Higgins-Luthman et al. |
| 2010/0228437 A1 | 9/2010 | Hanzawa et al. |
| 2011/0055727 A1 * | 3/2011 | Dawson ............. G06F 3/04815 |
| | | 715/753 |
| 2012/0044066 A1 | 2/2012 | Mauderer et al. |
| 2012/0062743 A1 | 3/2012 | Lynam et al. |
| 2012/0154591 A1 | 6/2012 | Baur et al. |
| 2012/0218412 A1 | 8/2012 | Dellantoni et al. |
| 2012/0262340 A1 | 10/2012 | Hassan et al. |
| 2013/0124052 A1 | 5/2013 | Hahne |
| 2013/0129150 A1 | 5/2013 | Saito |
| 2013/0131918 A1 | 5/2013 | Hahne |
| 2013/0250114 A1 | 9/2013 | Lu |
| 2014/0067206 A1 | 3/2014 | Pflug |
| 2014/0156157 A1 | 6/2014 | Johnson et al. |
| 2014/0222280 A1 | 8/2014 | Salomonsson |
| 2014/0313339 A1 | 10/2014 | Diessner et al. |
| 2014/0379233 A1 | 12/2014 | Chundrlik, Jr. et al. |

FOREIGN PATENT DOCUMENTS

| | | |
|---|---|---|
| EP | 1115250 | 7/2001 |
| EP | 1170173 | 1/2002 |
| JP | 6079889 | 5/1985 |
| JP | 6080953 | 5/1985 |
| JP | S6216073 | 4/1987 |
| JP | 6272245 | 5/1987 |
| JP | H1168538 | 7/1989 |
| JP | 0236417 | 2/1990 |
| JP | H2117935 | 9/1990 |
| JP | 03099952 | 4/1991 |
| JP | 6227318 | 8/1994 |
| JP | 07105496 | 4/1995 |
| JP | H730149 | 6/1995 |
| JP | 2630604 | 7/1997 |
| JP | 200274339 | 3/2002 |
| JP | 2003083742 | 3/2003 |
| JP | 20041658 | 1/2004 |
| WO | WO2011189812 | 7/2011 |
| WO | WO2012145822 | 11/2012 |
| WO | WO2013019795 | 2/2013 |
| WO | WO2013081985 | 6/2013 |
| WO | WO2013086249 | 6/2013 |
| WO | WO2013109869 | 7/2013 |

OTHER PUBLICATIONS

Porter et al., "Compositing Digital Images," Computer Graphics (Proc. Siggraph), vol. 18, No. 3, pp. 253-259, Jul. 1984.
Pratt, "Digital Image Processing, Passage—ED.3", John Wiley & Sons, US, Jan. 1, 2001, pp. 657-659, XP002529771.

* cited by examiner

VEHICLE VISION SYSTEM WITH ENHANCED DISPLAY FUNCTIONS

CROSS REFERENCE TO RELATED APPLICATION

The present application claims the filing benefits of U.S. provisional application Ser. No. 61/727,912, filed Nov. 19, 2012, which is hereby incorporated herein by reference in its entirety.

FIELD OF THE INVENTION

The present invention relates to vehicles with cameras mounted thereon and in particular to vehicles with exterior-facing cameras, such as forward facing cameras and/or sideward facing cameras and/or rearward facing cameras.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a vision system that utilizes one or more cameras or image sensors to capture image data of a scene exterior (such as forwardly) of a vehicle and provides a display of images indicative of or representative of the captured image data. The system of the present invention processes the image data and reproduces the images as avatars or virtual representations of the actual or real objects and scene present in the field of view of the camera or cameras of the vision system. The system of the present invention thus may provide an enhanced display of images in a high resolution manner and may provide enhanced texturing and coloring of the displayed images, while utilizing lower resolution cameras and/or reduced image processing devices and/or techniques. Optionally, the system may produce or create a full image of an object that is only partially present in the field of view of the camera, in order to enhance the display for viewing and understanding by the driver of the vehicle.

The present invention provides a vision system for a vehicle that includes at least one image sensor disposed at a subject vehicle and having a field of view exterior of the vehicle. A control, at least in part responsive to said image sensor, is operable to generate an avatar representative of at least one object or scene segment in the field of view of the image sensor. The vision system includes a display for displaying the avatar for viewing by a driver of the subject vehicle.

Optionally, the at least one image sensor may comprise a forward facing camera disposed at the subject vehicle. Optionally, the vision system is operable to display an avatar that is a substantial representation of an object that is only partially viewed by the image sensor to enhance the display for viewing and understanding by the driver of the subject vehicle. For example, the control may generate the avatar so that a portion of the displayed avatar representing a portion of the object is displayed as a phantom image to represent that viewing of that portion of the object by the image sensor is partially obstructed. Optionally, the control may generate the avatar so that a portion of the displayed avatar representing a portion of the object that is outside of the field of view of the image sensor is displayed as a phantom image.

Optionally, the control may generate the avatar with an imitated texture. Optionally, the control may be operable to determine objects at least partially present in the field of view of the image sensor and the control may deemphasize objects that are determined to be less important to the driver of the vehicle during a driving maneuver. For example, the control may deemphasize objects by at least partially removing the objects from the displayed image.

These and other objects, advantages, purposes and features of the present invention will become apparent upon review of the following specification in conjunction with the drawings.

DETAILED DESCRIPTION OF THE INVENTION

Figure 1:
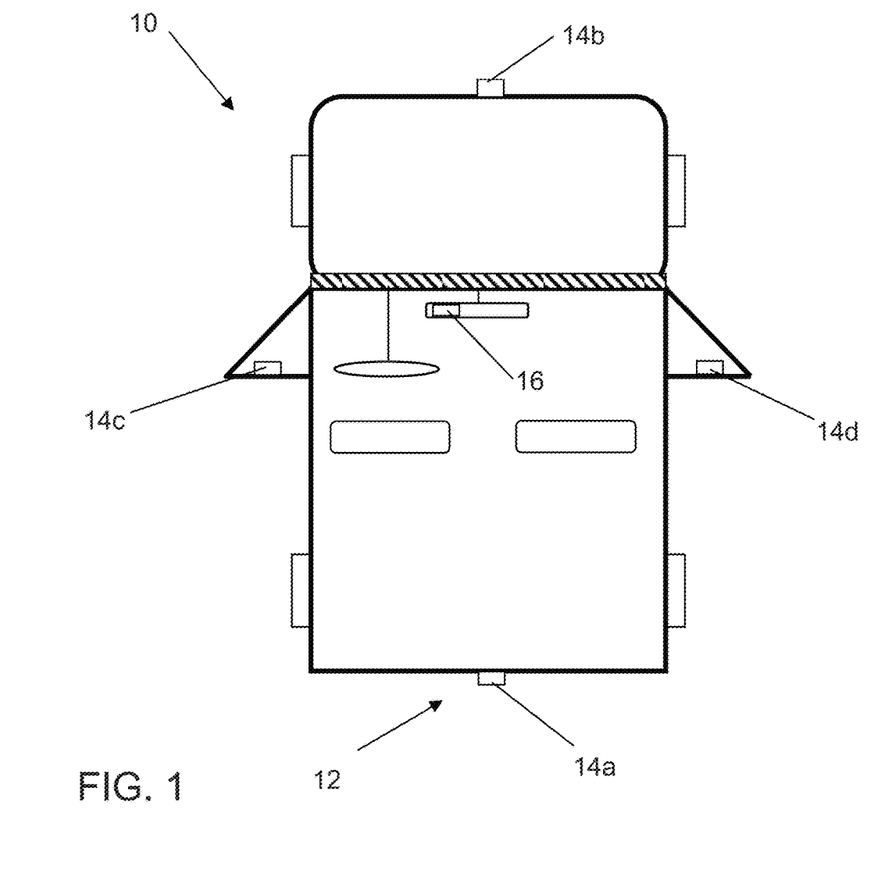
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at a front portion of the vehicle (or at the windshield of the vehicle and viewing through the windshield and forwardly of the vehicle), and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

Figure 5:
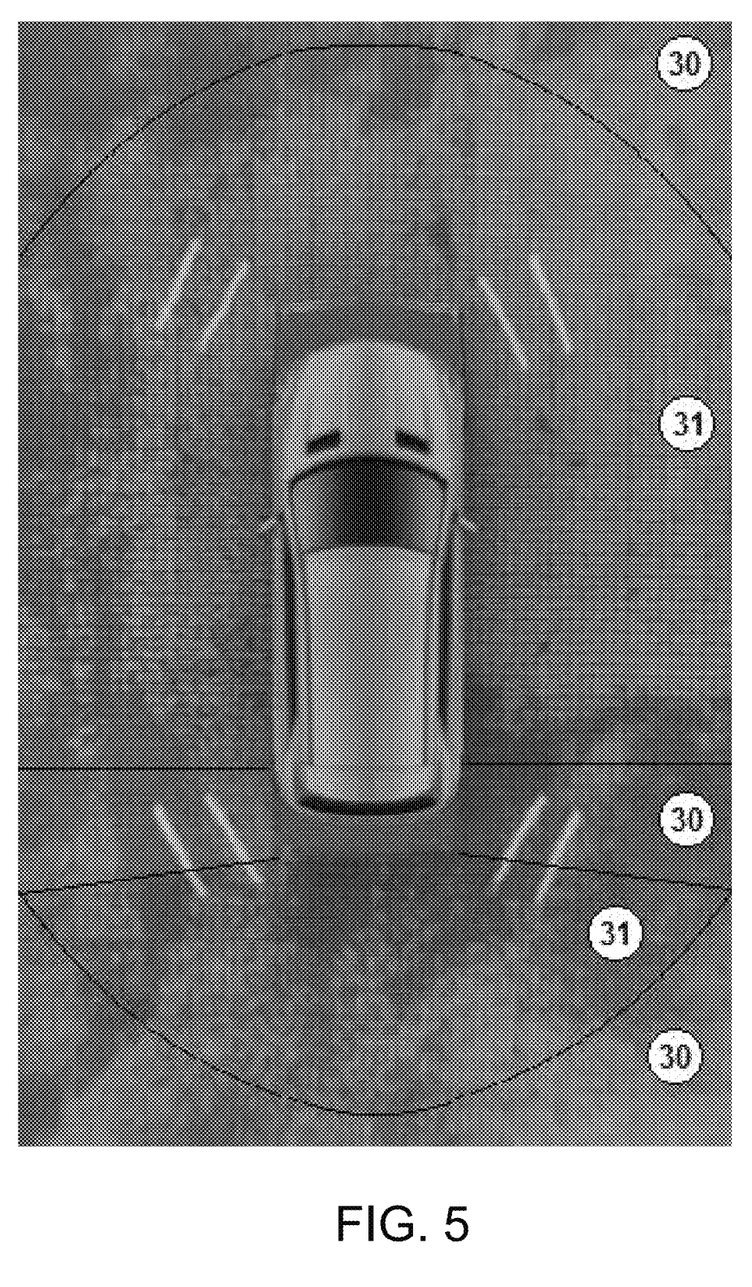
FIG. 5 is a plan view of a vehicle that shows a virtual top view with areas marked 30 which are blurry due to high distortion or high distance to the actual fish eye cameras which are providing the images of the front, rear and side regions, which are morphed and stitched as one image, and with the less blurry areas marked 31.

Due to data loss and natural or artificial blurring along the image processing chain, natural textures of the displayed environment are not reproduced in a satisfying manner unless very high resolution cameras are used. By the nature of the wide angle or fish eye lens typically used in automotive vision systems, especially for surround view vision systems and the like, the resolution of textures off center is much lower than at the center of the captured image (where the distortion due to the wide angle lens is reduced). Because of this, the textures are not reproduced evenly from the center to the farther edges when a top view is generated by image distortion and image stitching (see, for example, FIG. 5). The problem becomes worse when there is data compression and decompression within the image processing chain.

A solution of the present invention provides an augmented image or virtual image or avatar to provide enhanced image processing and/or display. Instead of generating an image in any kind of automotive view (front view, rear view, cross traffic view, surround view and/or the like) by deskewing, cropping, distorting and stitching and employing highly sophisticated brightness and color controls for the camera subsequent image enhancement algorithm, the system of the present invention may generate the requested views as augmented reality image reproductions.

It is easy to handle and achieve sharp, bright, unblurred images without glaring, halos or noise when all image components are fully computer generated or augmented instead of using real images captured by cameras (in real time). The data amounts are small and the necessary computing power and bandwidth demands are small or minimal. The key information may be easier and faster to perceive by a human eye/brain when looking at an augmented images instead of a real image.

Augmented reality views in general may have been proposed for use in automotive vision, and using overlays is already a kind of augmented reality. Also, it may be already known to reduce the level of details which become shown (at all) or highlighted as overlays and also to have sophisticated algorithms to prioritize which details may be chosen for showing or highlighting.

Figure 6:
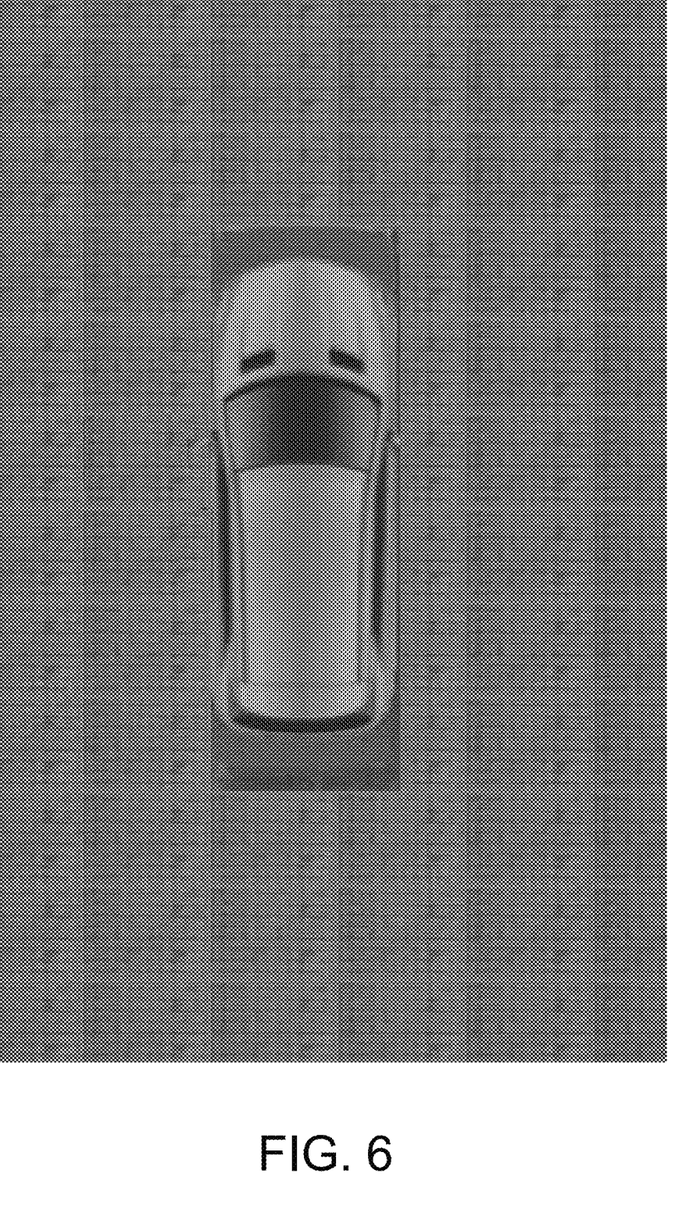
FIG. 6 is a plan view of a vehicle that shows a virtual top view in accordance with the present invention, shown with the ground texture being mapped as being comparably sharp in all areas around the vehicle.

The system of the present invention provides a method or means for mapping textures, such as can be seen with reference to FIG. 6. The method will allow the vision system or manufacturer of the vehicle or vision system to employ preferably low level (such as lower resolution) cameras, system environment and algorithm in terms of low resolution and/or low sensor performance and/or low lens quality and/or no or poor level of calibration procedures in use and/or data line bandwidth while employing high compression rates. The necessary resolution of a camera may be about 1/10 of the typically used Megapixel cameras. The present invention uses the cameras just to capture the environment's shape and to detect the present features and textures type. The presented human view then is an augmented reality according to the actively chosen view with imitated texture.

The view's structure may be quite similar to the usually employed views (such as a front view, rear view, cross traffic view, surround view and/or the like), which are generatable out of the cameras' captured images, and/or there may also be artificial views which are unknown or typically not used, since these were heretofore not directly producible based on the cameras' captured images or image data. For example a virtually elevated view point into the forward direction may be new, which may serve a better perceptibility, may be possible by augmented view construction (such as, for example, as shown in FIG. 4).

Figure 2:
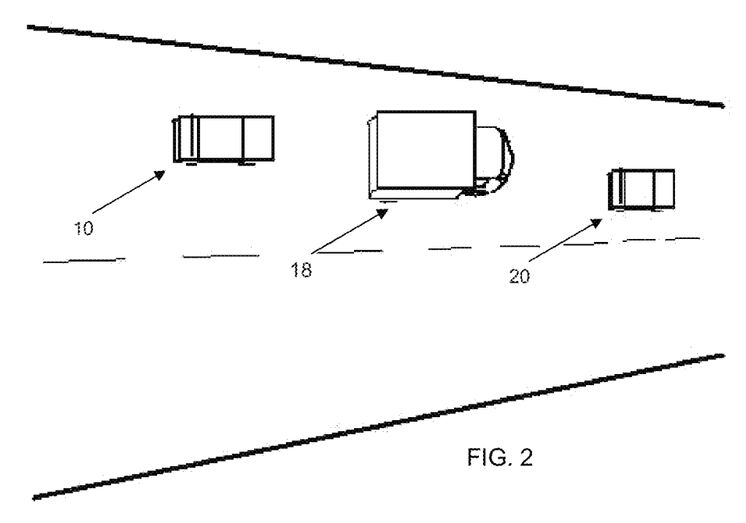
FIG. 2 is a plan view of a vehicle having a vision system in accordance with the present invention, shown with the vehicle following other vehicles on the road.
Figure 3:
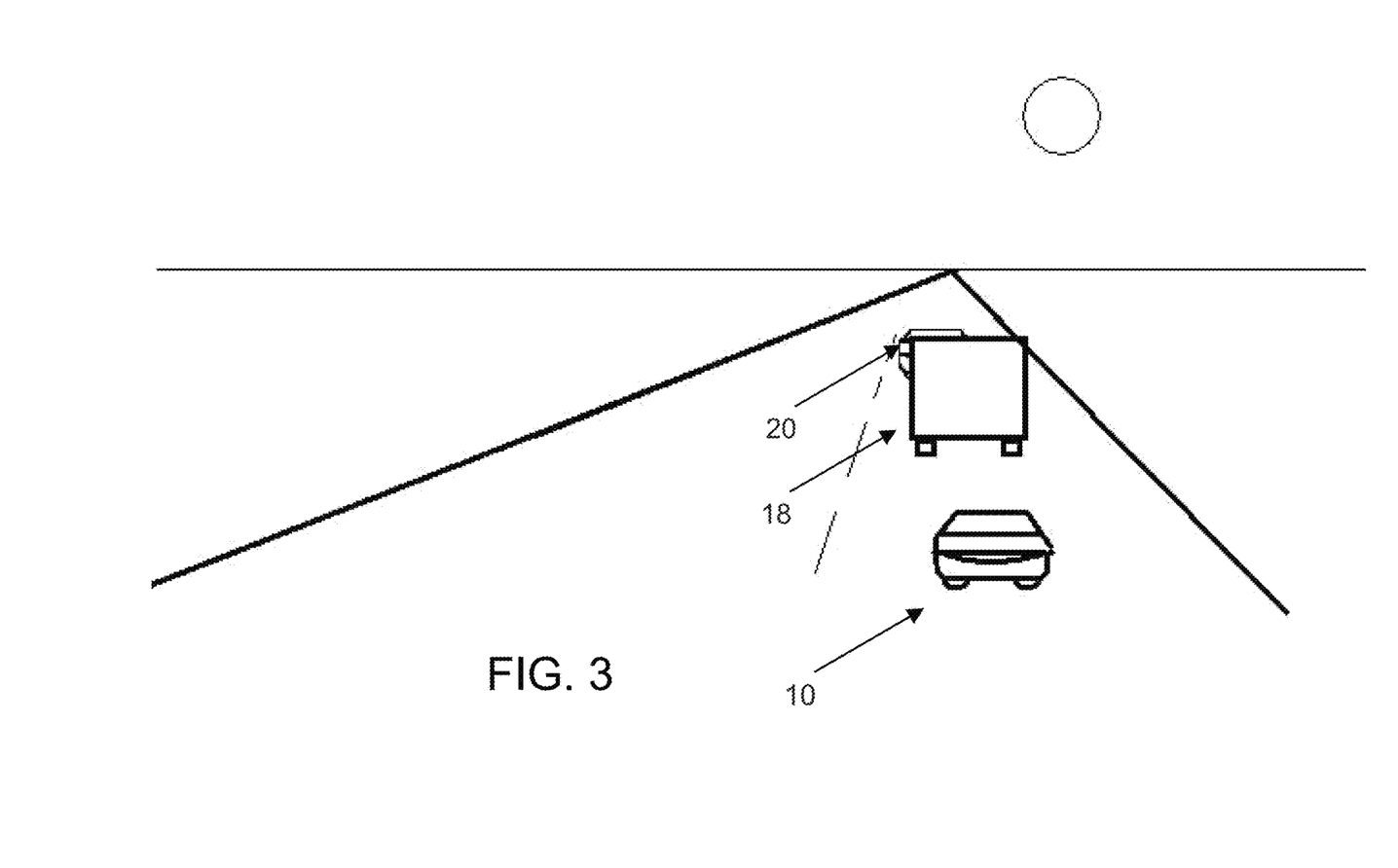
FIG. 3 is a view of an image captured by a forward facing camera of the subject vehicle.
Figure 4:
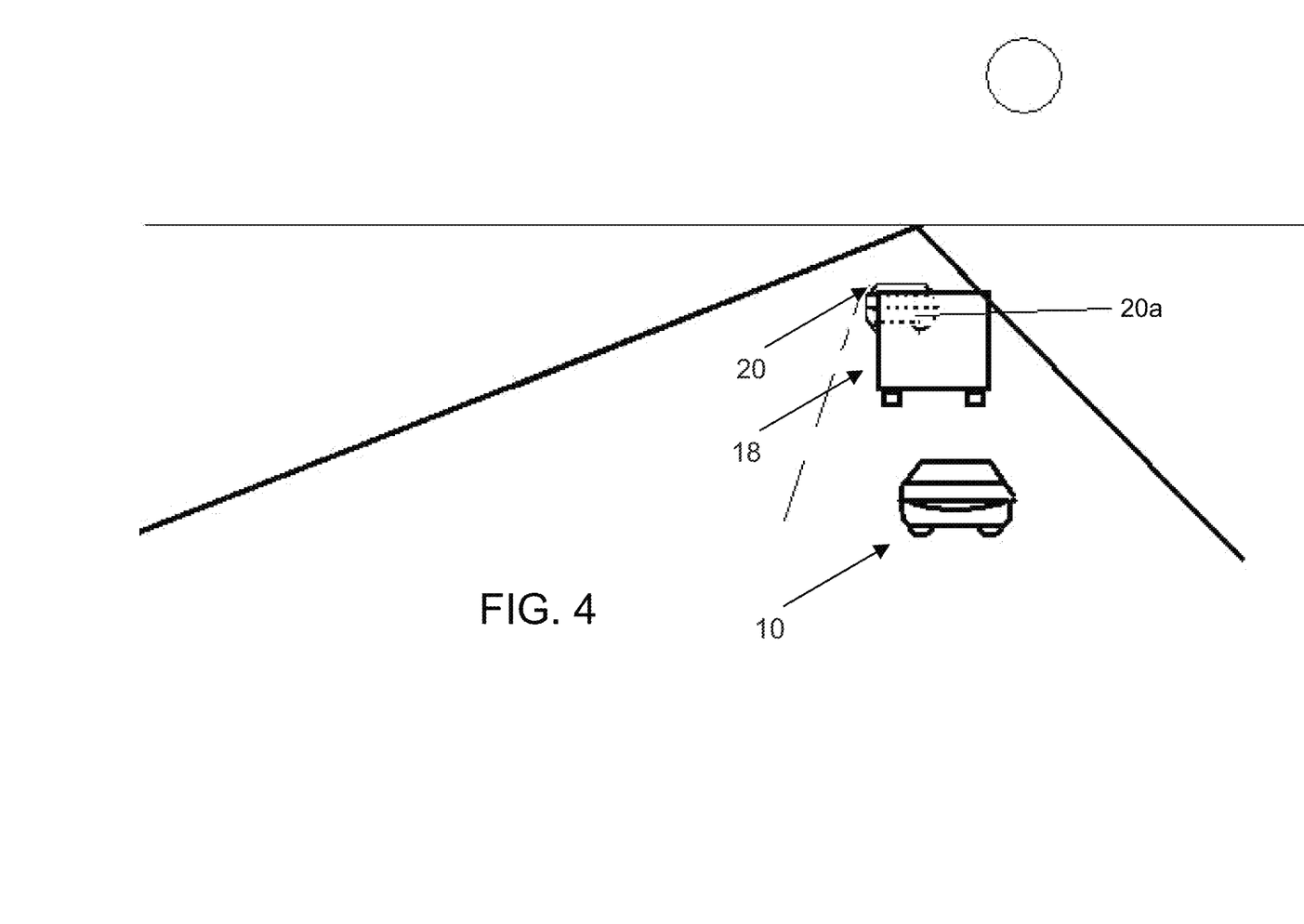
FIG. 4 is a view of an augmented image captured by the forward facing camera of the subject vehicle and augmented in accordance with the present invention.

As can be seen with reference to FIGS. 2-4, the subject vehicle 10 may be following another vehicle 18 (such as the truck in FIGS. 2-4), which may in turn be following a third vehicle 20. As shown in FIG. 3, the view of the leading vehicle 20 (as viewed by the forward facing camera) may be partially obstructed or blocked by the second vehicle 18, whereby the driver may not readily appreciate or discern the presence of the leading vehicle ahead of the second vehicle. As shown in FIG. 4, the system may generate a display whereby a portion 20a of the leading vehicle 20 may be shown in phantom (such as by using dashed or phantom lines or such as by using translucent coloring schemes or the like) so that the driver can readily discern the presence of the leading vehicle ahead of the vehicle that he or she is directly following. The vision system, via image processing of image data captured by the forward facing camera, may determine the presence of the leading vehicle (or other objects or vehicles that are only partially present in the field of view of the camera, either because the view of part of the object is obstructed or because part of the object is located outside of the field of view itself) and may determine or approximate the portion that is missing or obstructed and may generate an avatar or approximation or animation of the missing or obstructed portion of the object to enhance the viewing and discernibility of that object to the driver that is viewing the displayed generated images on the display screen.

For example, if a portion of a vehicle is viewed by the camera (such as shown in FIG. 3), the system may detect the portion of the vehicle and may (such as via image processing of image data captured by the camera) determine what the viewed portion is (such as a portion of a vehicle or a portion of a sign or a portion of a tree or other object) and, responsive to that determination, the system estimates or determines what the non-viewed portion may look like (such as via using a generic representation, such as a generic vehicle for a determined partially hidden vehicle, or via an estimation based on the part of the vehicle or object that is viewed by the camera). The system then generates an avatar or animation of the missing portion to fill in the parts that are missing (and optionally, the system may generate an avatar or animation of the determined object or vehicle and overlay the avatar over the object or vehicle, including the portion or portions of the object or vehicle that are viewed by the camera), and displays or overlays the avatar or animation onto displayed images. Optionally, the avatar or animation may be generated as part of a heads up display so as to be projected into the driver's field of view at a location that approximates where the driver's line of sight would be to the determined object or vehicle. The present invention thus provides an avatar or animation of at least the missing portions of vehicles and/or objects in the field of view of the vehicle camera (such as the forward viewing camera as described above or such as a rearward or sideward viewing camera, so as to assist the driver in reversing maneuvers and/or lane change maneuvers or the like) to enhance the driver's viewing and understanding of the presence of objects or vehicles in the scene in the path of travel of the vehicle.

It is known to use the likes of a rearward facing video camera and/or other exterior viewing cameras to capture video images of scenes/objects exterior the vehicle while the vehicle is, for example, traveling along a highway or executing a backup maneuver or reversing into a parking place. Such systems provide video displays, often in color and in high definition, that display video images of what is seen and captured by the automotive video cameras. It is left to the driver to view and to assimilate the video images being displayed to him or her in real time. Often, the driver is interested in an activity or an object or a portion of the videoed scene, and seeks to distinguish that sub-scene of interest from other vehicles and/or objects and/or items being simultaneously videoed. In this regard, the driver's task would be made easier if such non-critical and/or ancillary and/or extraneous items/objects/scene portions were not present or at least had their presence removed or substantially removed or mitigated.

In accordance with the present invention, the video images captured by the at least one automotive exterior viewing video camera are fed to, and are image processed by, an image processor (such as, for example, an EyeQ™ image processing chip available from Mobileye Vision Technologies Ltd. of Jerusalem, Israel). In addition to detecting the presence and position of a given object in the videoed scene, the image processor creates an avatar or reproduction or simulation or virtual image of the given object. And the video image processor utilized, in whole or in part, substitutes or replaces or overlays on the real time video image of the subject object with the avatar simulation in such a manner that enhances the driver's viewing and understanding of the imaged scene. Thus, non-critical vehicles or objects or road side scenery can be de-emphasized and/or removed so that video display emphasizes and/or is focused on particular items or objects or scene segments of criticality to the driver at any given moment in time. Thus, use of an avatar or incarnation or virtual reality image (comprising an electronic image of at least a portion of the videoed scene that can then be manipulated by a video/image processor) allows the displayed images to be manipulated to emphasize or deemphasize selected portions of the videoed scene and/or selected objects or the like present in the videoed scene.

For example, when the driver is reversing the subject or equipped vehicle into a vacant parking space, video images of objects or other vehicles that are not immediately adjacent the vacant parking place or space may be deemphasized and/or removed or partially removed (such as by rendering them semi-transparent or mostly transparent and/or replacing them with avatars or the like). Thus, the driver can readily focus on the displayed video images of importance while executing the reversing maneuver. However, should one of the deemphasized or removed objects move from its parked position (where it was determined to be not highly relevant to the current reversing maneuver of the subject vehicle), such movement may render that object or vehicle a more important or relevant or critical item for viewing by the driver executing that particular parking maneuver. If so, the moving and now important object or other vehicle (or pedestrian or the like) may be viewed in real-time video (not as an avatar), so as to enhance the viewability and discernibility of the object or other vehicle or pedestrian to the driver of the reversing subject vehicle.

To reproduce the impression of an outside scene the scene's structure and/or general shape may be reproduced and the texture imitated by a mapping texture out of a library. The library may contain several kinds of surfaces which may appear in a vehicle's environment. For example, there may be any grains, granularities and colorations of asphalt, gravel, dirt, sand, water surface (puddle), snow, ice interlocking pavement, tiling, boarding, laminate and/or the like. The mapping texture may have a logical order. The texture which is closest to that in real at that specific position may be chosen (such as via a texture matching method or protocol that selects the appropriate or "closest" texture for the object to be imaged. To avoid abrupt thresholds in texture there may be just one texture type reproduced in the augmented view even when different textures are found in the real source image(s) as long as a wide level of similarity is still given. Texture thresholds which are really present in nature may be reproduced by two border lining textures in the augmented view.

Objects on the ground, which are large enough to be perceived and specified by the cameras, may be reproduced as well. For example, sharp and clean gully covers may be mapped onto the same position (on the floor) within the augmented view as found in reality, also when the gullies in reality are cracked and dirty. As known, objects such as an adult human, child, bicycle, vehicle, car, truck, policeman on a horse, other animals, such as a cow, cat or dog or the like, a pole, snow pile, parking place markings, a pylon, a construction site boundary or the like, may be mapped unified into the augmented reality scene. The mapping may be flat or done by using 2D or 3D imposters. Any kind of bump mapping may become used (such as by utilizing aspects of the systems described in International Publication Nos. WO 2013/086249, published Jun. 13, 2013, and/or WO 2013/109869, published Jul. 25, 2013, which are hereby incorporated herein by reference in their entireties).

When a 3D reconstruction of the real world objects and scene can be achieved, the mapping may be direct to the same structure as the 3D reconstructed world or the 3D objects may be unified for a certain level (such as when two real vehicles have been detected correctly as vehicles (out of the cameras images), these may be reproduced as two uniform looking cars or different trucks as uniform trucks, and the like). There may be just differences in colors, but these may also be uniformed depending on the size/number of possible textures and shapes of objects present in the library. Unlike in reality, non-transparent objects may be shown as semi transparent, dotted or dithered to allow to perceive the scene behind an object (such as shown in FIG. 4, where a portion of the vehicle that is ahead of the truck is shown as dashed lines or the like so as to be "seen" through the truck). Highlighting (such as blinking, flashing, waving, colored, color changing and the like) warning symbols, arrows, tags, POIs and driving tunnels may come into use as well. The texture library may come with or be part of or incorporated in the automotive vision system, or may be provided by a server or cloud or the like (whereby the vision system may access the remote server via a telematics system of the vehicle or the like) and/or may be updated from time to time via remote or by a service device or by download or via a cell phone channel.

Thus, the present invention provides a vision system that captures image data of a scene exterior (such as forwardly) of the vehicle and provides a display of images indicative of the captured image data. The system of the present invention processes the image data and reproduces the images as representations of the actual or real objects and scene present in the field of view of the camera or cameras of the vision system. The system of the present invention thus may provide an enhanced display of images in a high resolution manner and may provide enhanced texturing and coloring of the displayed images, while utilizing lower resolution cameras and/or reduced image processing devices and/or techniques.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 2012/145822; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or U.S. patent applications, Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/895,610, filed Oct. 25, 2013; Ser. No. 61/895,609, filed Oct. 25, 2013; Ser. No. 61/893,489, filed Oct. 21, 2013; Ser. No. 61/886,883, filed Oct. 4, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/756,832, filed Jan. 25, 2013; Ser. No. 61/754,804, filed Jan. 21, 2013; Ser. No. 61/736,104, filed Dec. 12, 2012; Ser. No. 61/736,103, filed Dec. 12, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,911, filed Nov. 19, 2012; and/or Ser. No. 61/727,910, filed Nov. 19, 2012, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094;

6,396,397; 6,806,452; 6,690,268; 7,005,974; 7,123,168; 7,004,606; 6,946,978; 7,038,577; 6,353,392; 6,320,176; 6,313,454; and 6,824,281, and/or U.S. patent application Ser. No. 12/508,840, filed Jul. 24, 2009, and published Jan. 28, 2010 as U.S. Pat. Publication No. US 2010-0020170, and/or U.S. patent application Ser. No. 13/534,657, filed Jun. 27, 2012, and/or International Publication Nos. WO 2010/099416; WO 2011/028686; and/or WO 2013/016409, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361, and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786; 5,786,772; and/or 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795;

WO 2012/075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications, Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. A vision system for a vehicle, said vision system comprising:
    at least one image sensor disposed at a subject vehicle and having a field of view exterior of the vehicle;
    an image processor operable to process image data captured by said at least one image sensor;
    a control, wherein said control, at least in part responsive to processing of captured image data by said image processor, is operable to generate an avatar representative of at least one object or scene segment in the field of view of said at least one image sensor;
    a display for displaying images indicative of captured image data and for displaying the avatar for viewing by a driver of the subject vehicle;
    wherein said vision system is operable to display an avatar that is a substantial representation of an object that is only partially viewed by said image sensor to enhance the display for viewing and understanding by the driver of the subject vehicle; and
    wherein said control generates the avatar so that a portion of the displayed avatar representing a portion of the object is displayed as a phantom image to represent that viewing of that portion of the object by said image sensor is partially obstructed.

2. The vision system of claim 1, wherein said at least one image sensor comprises a forward facing camera disposed at the subject vehicle.

3. The vision system of claim 1, wherein said control provides an enhanced display of images in a high resolution manner while utilizing lower resolution cameras and reduced image processing.

4. The vision system of claim 1, wherein said control generates the avatar with an imitated texture.

5. The vision system of claim 1, wherein said control is operable to determine objects at least partially present in the field of view of said image sensor and wherein said control is operable to deemphasize objects in the displayed image that are determined to be less important to the driver of the vehicle during a driving maneuver.

6. The vision system of claim 5, wherein said control deemphasizes an object by partially removing the object from the displayed image.

7. The vision system of claim 5, wherein said control deemphasizes an object by displaying the object in phantom in the displayed image.

8. A vision system for a vehicle, said vision system comprising:
    at least one image sensor disposed at a subject vehicle and having a field of view exterior of the vehicle;
    an image processor operable to process image data captured by said at least one image sensor;
    a control, wherein said control, at least in part responsive to processing of captured image data by said image processor, is operable to generate an avatar representative of at least one object or scene segment in the field of view of said at least one image sensor;
    a display for displaying images indicative of captured image data and for displaying the avatar for viewing by a driver of the subject vehicle;
    wherein said vision system is operable to display an avatar that is a substantial representation of an object that is only partially viewed by said image sensor to enhance the display for viewing and understanding by the driver of the subject vehicle; and
    wherein said control generates the avatar so that a portion of the displayed avatar representing a portion of the object is displayed as a phantom image to represent that the portion of the object is outside of the field of view of said image sensor.

9. The vision system of claim 8, wherein said at least one image sensor comprises a forward facing camera disposed at the subject vehicle.

10. The vision system of claim 8, wherein said control provides an enhanced display of images in a high resolution manner while utilizing lower resolution cameras and reduced image processing.

11. The vision system of claim 8, wherein said control generates the avatar with an imitated texture.

12. The vision system of claim 8, wherein said control is operable to determine objects at least partially present in the field of view of said image sensor and wherein said control is operable to deemphasize objects in the displayed image that are determined to be less important to the driver of the vehicle during a driving maneuver.

13. The vision system of claim 12, wherein said control deemphasizes an object by partially removing the object from the displayed image.

14. The vision system of claim 12, wherein said control deemphasizes an object by displaying the object in phantom in the displayed image.

\* \* \* \* \*